(12) United States Patent (10) Patent No.: US 8,615,748 B2
Doyle et al. (45) Date of Patent: Dec. 24, 2013

(54) CONTROL FLOW ANALYSIS USING DEDUCTIVE REACHING DEFINITIONS

(75) Inventors: Patrick R. Doyle, Toronto (CA); Allan H. Kielstra, Ajax (CA); Pramod Ramarao, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 12/903,552

(22) Filed: Oct. 13, 2010

(65) Prior Publication Data

US 2011/0191761 A1 Aug. 4, 2011

(30) Foreign Application Priority Data

Feb. 4, 2010 (CA) .................................... 2691851

(51) Int. Cl.
*G06F 9/45* (2006.01)
(52) U.S. Cl.
USPC .......................................................... 717/156
(58) Field of Classification Search
USPC .......................................................... 717/156
See application file for complete search history.

(56) References Cited

U.S. PATENT DOCUMENTS

| | | | |
|---|---|---|---|
| 5,107,418 A * | 4/1992 | Cramer et al. ................. | 717/155 |
| 5,586,329 A | 12/1996 | Knudsen et al. | |
| 5,836,014 A | 11/1998 | Falman, Jr. | |
| 5,920,716 A | 7/1999 | Johnson et al. | |
| 5,923,883 A | 7/1999 | Tanaka et al. | |
| 5,943,499 A | 8/1999 | Gillies et al. | |
| 6,311,146 B1 * | 10/2001 | Hao et al. ......................... | 703/14 |
| 7,124,032 B2 | 10/2006 | Wagner | |
| 7,207,038 B2 | 4/2007 | Bicsak et al. | |
| 7,272,829 B1 | 9/2007 | Meirowitz | |
| 7,305,666 B2 | 12/2007 | Burger et al. | |
| 7,350,061 B2 | 3/2008 | Gillies et al. | |
| 7,376,941 B2 | 5/2008 | Allen | |
| 7,606,832 B2 | 10/2009 | Chafle et al. | |
| 7,882,105 B2 | 2/2011 | Laugier et al. | |
| 8,296,748 B2 | 10/2012 | Cheng et al. | |
| 8,402,429 B2 | 3/2013 | Kielstra | |
| 2003/0023388 A1 * | 1/2003 | Wagner .......................... | 702/20 |

(Continued)

FOREIGN PATENT DOCUMENTS

CA 2675680 A1 11/2009

OTHER PUBLICATIONS

Notice of allowance dated Nov. 14, 2012 regarding U.S. Appl. No. 12/856,302, 20 pages.
Binkley, "Interprocedural Constant Propagation using Dependence Graphs and a Data-Flow Model," Compiler Construction, Lecture Notes in Computer Science, Proceedings of the 5th International Conference, vol. 786, Apr. 1994, 15 pages.
Briggs et al., "Using Conditional Branches to Improve Constant Propagation," Center fro Research on Parallel Computation, Rice University, CRPC-TR95533, Apr. 1995, 11 pages.
Wegman et al., "Constant Propagation with Conditional Branches," Journal of ACM Transactions on Programming Languages and Systems, vol. 13, Issue 2, Apr. 1991, 31 pages.
Aho et al., "Principles, Techniques and Tools," Chapter 10.5, Introduction to Global Data-Flow Analysis, copyright 1986, reprinted Mar. 1988, Addison-Wesley, 18 pages.

*Primary Examiner* — Li B Zhen
*Assistant Examiner* — Joanne Macasiano
(74) *Attorney, Agent, or Firm* — Yee & Associates, P.C.; David A. Mims, Jr.

(57) ABSTRACT

A computer-implemented process for deductive reaching definition analysis receives a control flow graph to form a set of received blocks and edges, performs traditional reaching definitions to produce bit-vectors OUT(b), GEN(b) and KILL (b) for each block in the set of received blocks and receives impossibility indicators for a set of definitions that are impossible on specific edges. The computer-implemented process further performs deduction operations using a combination of the bit-vectors and impossibility indicators to deduce that additional definitions cannot reach certain blocks to create resulting reachability information and provides the resulting reachability information as a result to a requestor. A related system and program product is also provided.

17 Claims, 9 Drawing Sheets

(56) References Cited

U.S. PATENT DOCUMENTS

| | | | |
|---|---|---|---|
| 2005/0235265 A1* | 10/2005 | Allen | 717/126 |
| 2006/0106748 A1* | 5/2006 | Chafle et al. | 707/1 |
| 2007/0033206 A1* | 2/2007 | Laugier et al. | 707/100 |
| 2007/0294663 A1 | 12/2007 | McGuire et al. | |
| 2008/0091926 A1* | 4/2008 | Kawahito | 712/226 |
| 2008/0109471 A1 | 5/2008 | Subbian et al. | |
| 2009/0049437 A1 | 2/2009 | Woersching et al. | |
| 2009/0064112 A1 | 3/2009 | Inagaki et al. | |
| 2009/0125893 A1 | 5/2009 | Copeland et al. | |
| 2010/0023931 A1 | 1/2010 | Cheng et al. | |

* cited by examiner

CONTROL FLOW ANALYSIS USING DEDUCTIVE REACHING DEFINITIONS

BACKGROUND

1. Field

This disclosure relates generally to program flow control analysis in a data processing system and more specifically to deductive reaching definition analysis.

2. Description of the Related Art

A control flow graph (CFG) of a computer program represents all paths that might be traversed during execution of the computer program. The graph depicts the logic flow in terms of branching, transfer of control, among related nodes of the computer program. Many compiler optimizations and static analysis tools typically use a control flow graph.

Each node in the control flow graph represents a basic block. A basic block is a portion of code without any jumps or branches. A target of a branch starts a new block, and a branch ends a block. Directed edges represent branches within the control flow. An entry block is used to represent where control enters into the flow graph, and an exit block is used to represent where control flow leaves the block. Blocks to which control may transfer after reaching the end of a specific block are called successors of the specific, while the blocks from which control may have come to a specific block are called predecessors of the specific block.

Reaching definitions is a control flow graph property useful in optimization. A reaching definition for a given instruction is another instruction, in which the target variable may reach the given instruction without an intervening assignment. That is the variable may not receive an intervening change in value. For example, a variable a set to a=1 in a first instruction of a first block and set to a value of 2 in a fifth instruction of the same block. The setting of the variable to a value of 2 is an intervening change that ends the possibility of the variable with a value of 1 reaching a subsequent block.

A traditional reaching definition analysis uses a graph-theoretic notion of reaching by declaring that a definition reaches a use if there is some path in the control flow graph from the definition leading to the use that contains no intervening definition of the same variable. This definition of reaching is a conservative approximation.

Typical data flow analysis uses a conservative approximation for possible values a variable may have. The conservative approach does not allow speculation of what value a variable may possess. Therefore, when a value of a variable is unknown at a point in a program execution, and following a conservative approach, the value cannot be excluded. Hence a setting of one variable may be presumed to imply nothing with regard to the setting of another value. For example, when a initial set of variables a=a1, b=b1, c=c1 and d=d1 flows through a set of blocks where in one block c=c2 and d=d2, in another block b=b2 and d=d3, and further through a control point c==c2, nothing can be said with regard to the disposition of values of d other than d cannot equal d1 because d was set to d2 and d3. Therefore, as a result of ordinary analysis both instances of b1, b2 and d2, d3 need to be included as reaching definitions when such inclusion may not be meaningful. The result lacks precision.

SUMMARY

According to one embodiment, a computer-implemented process for deductive reaching definition analysis receives a control flow graph to form a set of received blocks and edges, performs traditional reaching definitions to produce bit-vectors OUT(b), GEN(b) and KILL(b) for each block in the set of received blocks and receives impossibility indicators for a set of definitions that are impossible on specific edges. The computer-implemented process further performs deduction operations using a combination of the bit-vectors and impossibility indicators to deduce that additional definitions cannot reach certain blocks to create resulting reachability information and provides the resulting reachability information as a result to a requestor.

According to another embodiment, a computer program product for deductive reaching definition analysis is presented. The computer program product comprises a computer recordable-type storage media containing computer executable program code stored thereon. The computer executable program code comprises computer executable program code for receiving a control flow graph to form a set of received blocks and edges, computer executable program code for performing traditional reaching definitions to produce bit-vectors OUT(b), GEN(b) and KILL(b) for each block in the set of received blocks, computer executable program code for receiving impossibility indicators for a set of definitions that are impossible on specific edges, computer executable program code for performing deduction operations using a combination of the bit-vectors and impossibility indicators to deduce that additional definitions cannot reach certain blocks to create resulting reachability information and computer executable program code for providing the resulting reachability information as a result to a requestor.

According to another embodiment, an apparatus for deductive reaching definition analysis is presented. The apparatus comprises a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit executes the computer executable program code to direct the apparatus to receive a control flow graph to form a set of received blocks and edges, perform traditional reaching definitions to produce bit-vectors OUT(b), GEN(b) and KILL(b) for each block in the set of received blocks, receive impossibility indicators for a set of definitions that are impossible on specific edges, perform deduction operations using a combination of the bit-vectors and impossibility indicators to deduce that additional definitions cannot reach certain blocks to create resulting reachability information and provide the resulting reachability information as a result to a requestor.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
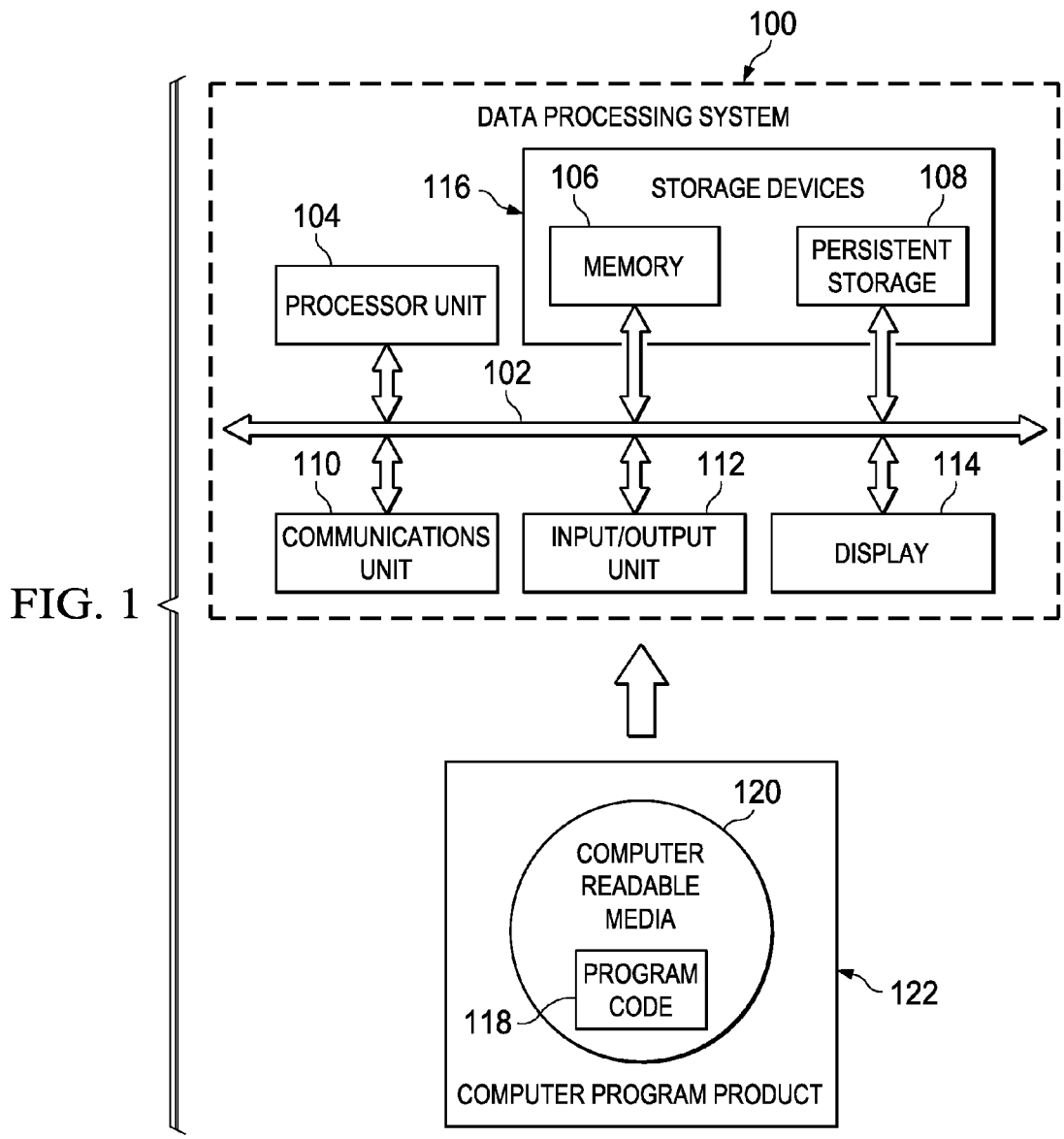
FIG. 1 is a block diagram of an exemplary data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product tangibly embodied in any medium of expression with computer usable program code embodied in the medium.

Computer program code for carrying out operations of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Turning now to FIG. 1, a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples, the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Terminology used in the remainder of this document considers bit-vectors as either column vectors of Booleans, or as sets of definitions, interchangeably. Either Boolean algebra or set notation may be used when operating on vectors to produce vectors, reserving other notations to represent matrix operations. Thus, "×" represents matrix multiplication (shown explicitly for clarity), while ∩ (set notation) would be used to represent a set intersection of two bit-vectors, which would be equivalent to a pair-wise intersection of the column vector elements. The "+" and "−" are used for set union and set difference respectively. A set of useful operators is further defined including a horizontal wipe operator, which produces a square matrix, "M", from a column vector as follows: $\bar{x}^{\ominus} \equiv \bar{x}[1\ 1\ \ldots\ 1]$, where "×" denotes matrix multiplication as previously described. The operation produces a matrix with a row of ones for each bit set in the given bit-vector. There is also the vertical wipe operator, which is the transpose of the horizontal wipe operator.

The union product or u-product of two bit-vectors is defined as: $\bar{x} \oplus \bar{y} = \bar{x}^{\ominus} \cup \bar{y}^{\ominus^T}$. The u-product produces a square matrix with a row of "1 s" for each bit in "x" and a column of "1 s" for each bit in "y". The intersection product or i-product of two bit-vectors is defined as: $\bar{x} \otimes \bar{y} = \bar{x}^{\ominus} \cap \bar{y}^{\ominus^T} = \bar{x} \times \bar{y}^T$.

Special notation is used for intersection and union products of bit-vectors with themselves as in: $\bar{x}^{\oplus} \equiv \bar{x} \oplus \bar{x}$ and $\bar{x} \otimes \equiv \bar{x} \otimes \bar{x}$. $M^T$ is used to represent the transpose of matrix "M", and $M^{DIAG}$ is used to represent a bit-vector comprising the elements from the main diagonal of matrix "M".

According to an illustrative embodiment and using data processing system 100 of FIG. 1 as an example, a computer-implemented process for deductive reaching definition analysis is presented. Processor unit 104 receives a control flow graph from communications unit 110, input/output unit 112 or persistent storage devices 116 to form a set of received blocks and edges, and further performs traditional reaching definitions to produce bit-vectors OUT(b), GEN(b) and KILL(b) for each block in the set of received blocks. Processor unit 104 further receives impossibility indicators indicating a set of definitions is impossible on some edges. Processor unit 104 further performs deduction operations, using a combination of the bit-vectors and impossibility indicators to deduce that additional definitions cannot reach certain blocks, to create resulting reachability information. Processor unit 104 provides the resulting reachability information as a result to a requestor using communications unit 110, input/output unit 112 or memory 106 or persistent storage 108 of storage devices 116. A requester processes the results in the same manner as traditionally computed reaching definitions.

The deductive reaching definitions do not propagate definitions ("defs"); rather deductive reaching definitions propagate the implications of the definitions. Ordinary reaching definitions typically propagate, for example, definitions c2 and d2 independently around the control flow graph. In contrast, deductive reaching definitions propagate the proposition "d==d2 implies c∈{c2}". Upon reaching a predicate that makes the right-hand side of this proposition impossible on one edge, the left-hand side can be deduced as also false on this edge, thereby reducing the set of definitions reaching a subsequent block.

Processor unit 104 further executes instructions stored in memory 106 or from persistent storage 108. Instructions may further be obtained through communications unit 110, or through input/output unit 112 in the form of program code 118. Processor unit 104 executes program code 118 to perform the sequence of operations just described.

In an alternative embodiment, program code 118 containing the computer-implemented method may be stored within computer readable media 120 as computer program product 122. In another illustrative embodiment, the process may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Using appropriate dataflow equations as described later, the process then combines bit-vector information with additional information about branches in the control flow graph to produce a set of bit matrices in which each bit describes a reachability relationship between some pair of definitions. The dataflow analysis examines these relationships to deduce the impossibility of some definitions in some blocks. Responsive to a determination that the dataflow analysis has terminated, the process then computes a main diagonal of the resulting bit-matrix for each block and provides the computed main diagonal as a substitute for a result that would have been provided by traditional reaching definitions. The result is then processed as would any traditional reaching definition.

Figure 2:
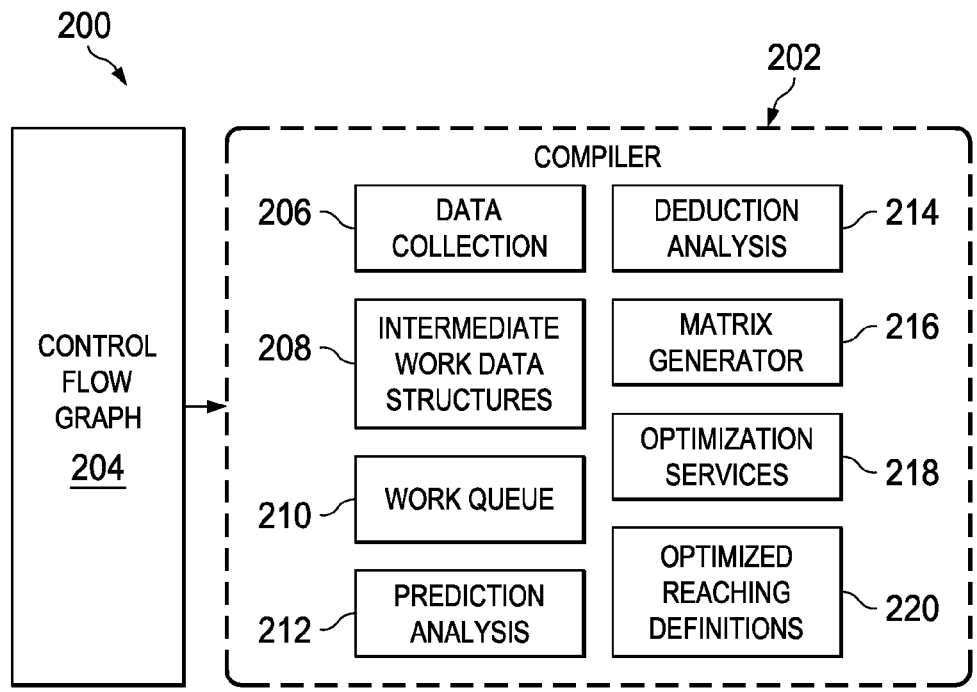
FIG. 2 is a block diagram of a compilation system, in accordance with various embodiments of the disclosure.

With reference to FIG. 2, a block diagram of a compilation system that may be implemented within the data processing system of FIG. 1, in accordance with various embodiments of the disclosure is presented. Compilation system 200 comprises a number of components for compilation of source code into computer executable program code or computer executable instructions. Components of compiler system 200 include, but are not limited to, compiler 202, control flow graph 204, data collection 206, intermediate work data structures 208, work queue 210, predication analysis 212, deduction analysis 214, matrix generator 216, optimization services 218 and optimized reaching definitions 220.

Compilation system 200 receives input into compiler 202 in the form of control flow graph 204. Control flow graph 204 provides the programming language instructions including program variables for the application of interest. The application may be a code portion of an application, a function, procedure or other compilation unit for compilation. Suitable tools or processes readily available may be used to generate the control flow graph.

The information of control flow graph 204 is gathered by data collection 206 into a set of received blocks. In the example, the set of received blocks is formed in a reverse posting order into work queue 210. Entries are typically maintained in a desired processing order with an entry selected from the front of the work queue for processing while other entries to be processed are added to the end. Other means of arranging workflow and selection order may be used to traverse the control flow graph. Predication analysis 212 performs predicate operation analysis of each edge in control flow graph 204. Predication analysis 212 provides a capability to analyze predicates associated with selected blocks for conditions of impossibility. For example, a situation in which a branch condition is true on one side of the predicate but false on the other creates an impossible instance. Instances in which the statement is no longer true may then be eliminated. Predicate filtering therefore filters a set of definitions based on predicates from conditional branch that preclude certain paths at runtime.

Deduction analysis 214 comprises a set of services capable of analyzing the various types and quantity of information obtained in the various nodes of control flow graph 204 to deduce a possibility of a definition reaching a respective specific target. For example, deduction analysis 214 processes the information received in control flow graph 204 through intermediate work data structures 208 to identify possible and impossible reaching definitions thereby providing more precise control flow definitions comprising remaining possible values. Intermediate work data structures 208 comprise a set of IN, OUT, GEN and KILL matrices and vectors associated with specific blocks comprising control flow graph 204. Deduction analysis therefore tracks not just the definition but rather relationships between pairs of definitions. Without the additional information and consideration, the result would be the same as predicate filtering. Deduction analysis may also be referred to as implication tracking and is more closely related to what a human reader of a control flow graph may perceive.

Matrix generation 216 provides a capability to create a data structure that may typically be an array, or table, of bit values wherein the nxn table represents combinations of each of n variable definitions. The bit matrix for the entry block includes a dummy definition for each variable. Each bit at a row, column intersection, (r, c), represents, for the corresponding point, a row definition reaches only if the column definition reaches as well. Further at a specified location, the value of the bit is set to 1 if and only if the definition reaches. When there is a variable V such that (r, c) is zero for all definitions c defining V, then the definition corresponding to r does not reach as well. Therefore to have a value set, some definition of the variable must reach the point of interest.

Values of the main diagonal of a matrix correspond to values of traditional reaching definitions. The matrix as generated is symmetric; therefore maintaining only one half the matrix typically saves storage space. For example, cells below the diagonal may be eliminated to reduce the storage needs because the values can be derived from mirrored cells above the diagonal. When the lower left cell (r, c) is required, the corresponding mirrored cell, (c, r) from the upper right portion may be used in place.

Optimization services 218 is a set of services provided by compiler 202 that may provide additional information to prune the set of possible definitions on a specified control flow graph edge. Optimized reaching definitions 220 are the result of processing control flow graph 204 through compiler 202. Optimized reaching definitions 220 are provided in the same form as traditionally derived reaching definitions ready to be processed by other components. Therefore the enhanced support of the illustrative embodiments works with components in existence prior to the enhancements.

Figure 3:
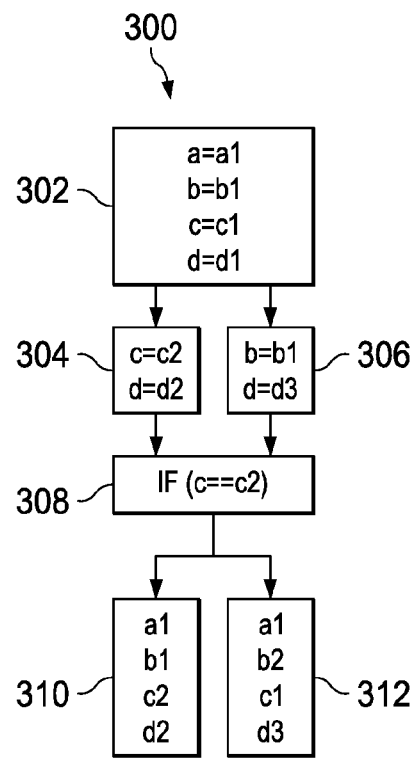
FIG. 3 is a block diagram of an overview of a control flow graph used in a reaching definition process, in accordance with various embodiments of the disclosure.

With reference to FIG. 3, a block diagram of a control flow graph used in a reaching definition process is presented. Control flow graph 300 is an example of a control flow graph used in a traditional reaching definition process in a data flow analysis.

Control flow graph 300 contains a list of definitions illustrating a program flow at different points. For example, entry block 302 contains an initial set of definitions. The definitions of entry block 302 are modified by additional definitions contained in block 304 and block 306. Block 304 modifies assignments to variables c and d. Block 306 modifies assignments to variables b and d. However the original assignment of variable a is unchanged through the intermediate blocks of block 304 and block 306. Block 310 and block 312 each contain a list of definitions that a user can determine to reach those blocks.

Reaching definitions propagate, for example, c2 and d2 of block 304 independently around the control flow graph of process 300. However, traditional reaching definitions analysis, like a typical forward bit-vector dataflow analysis, conservatively composes information at control merge points, such as block 308. This means that every definition that could reach block 308 from any path is considered to reach block 308, and, from there, block 310 and block 312. Traditional reaching definitions cannot determine that d3 doesn't reach block 310. For block 310, ordinary reaching definitions can determine that a==a1, and value propagation can determine that c==c2. However, ordinary data flow analysis cannot determine a value for b nor d because of the conservative composition that occurs at the start of block 308.

Figure 4:
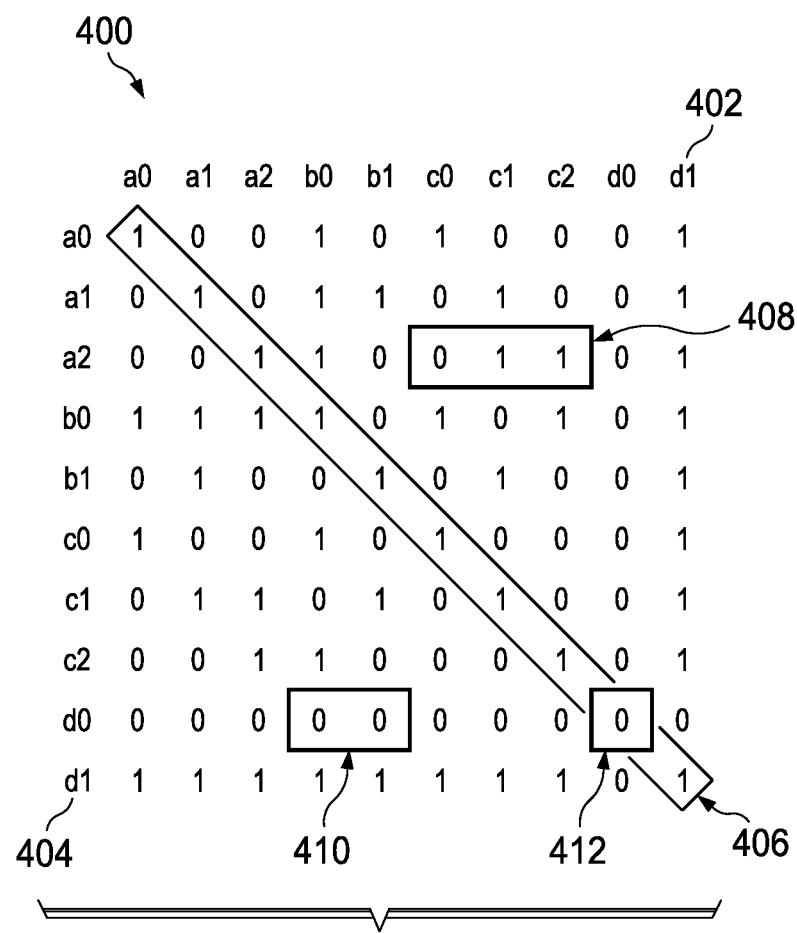
FIG. 4 is a block diagram of a deduction matrix, in accordance with various embodiments of the disclosure.

With reference to FIG. 4, a block diagram of a definition matrix, in accordance with various embodiments of the disclosure is presented. Definition matrix 400 is an example of a data structure containing a set of bit values representing reaching definitions as created using compilation process 200 of FIG. 2.

In the following examples, (b) represents an instance of a block in a set of blocks being processed. Subscript d denotes the "deductive" bit-matrices, for example, $IN_d(b)$ and $OUT_d(b)$ matrices. Without a subscript denotes bit-vectors arising from traditional reaching definitions analysis, such as IN(b) and OUT(b) for block (b). Subscript g denotes a use of a GEN set element.

Definition matrix 400 is generated to contain n×n cells as determined by the n number of definitions of a control flow graph being examined and represented. For example, when 12 definitions are being analyzed, definition matrix 400 will contain a 12×12 set of values. Row 402 represents the column header row. Each member of row 402 represents a potential variable reaching definition instance. Column 404 represents the row header column. Each member of column 404 represents a potential variable reaching definition instance. The header row and the header column are depicted in the example together with the data rows and columns, however this representation would not be typical and the header may be stored in another location. The actual matrix data structure would typically contain only the data rows and columns.

A bit, when set, contains a value of 1, while bit that is not set contains a value of 0. When there is no reaching definition for a respective variable instance, then the bit value representative of a potential reaching definition implication for the variable instance would be set to 0. When there is a reaching definition for a respective variable instance, then the bit value representative of the potential reaching definition implication for the variable instance is be set to 1. For example, a bit location at (R, C) being set to 1 means R reaches implies C reaches.

Diagonal 406 represents reaching definitions corresponding to a traditional reaching definition process. Values on one side of diagonal 406 are mirrored by corresponding values on the opposite side of diagonal 406. Definition matrix 400 is therefore symmetrical about the diagonal and also square. The result of applying the analysis in accordance with illustrative embodiments creates deduction matrix 400 in which diagonal 406 is provided as a result to compiler 202 of compilation process 200 of FIG. 2. Diagonal 406 is a resulting bit vector that is then used in a typical manner in further complier optimizations. In cases where an optimizer requires both the IN and OUT sets from traditional reaching definitions, computation of the $IN_d(b)$ and $OUT_d(b)$ matrices and production of main diagonals for both matrices would also be provided.

Block 408 indicates three locations of (a2, c0), (a2, c1) and (a2, c2). The location (a2, c0), implies when a=a2, c cannot equal c0 while locations (a2, c1) and (a2, c2) indicate c=c1 or c=c2.

Block 410 indicates at locations (d0, b0), and (d0, b1) when d=d0, b cannot equal b0 or b1 implying b has no reaching definitions. Because it is impossible to have no reaching definitions for b, d cannot equal d0. Block 412 contains a 0 in the diagonal at location (d0, d0) that indicates no reaching definitions are possible; therefore a row and column associated with the instance will also contain only 0 values. The typical goal of a deduction analysis process is to identify as many 0 value instances on diagonal 406 to reduce the processing of unnecessary blocks in the control flow graph.

Figure 5:
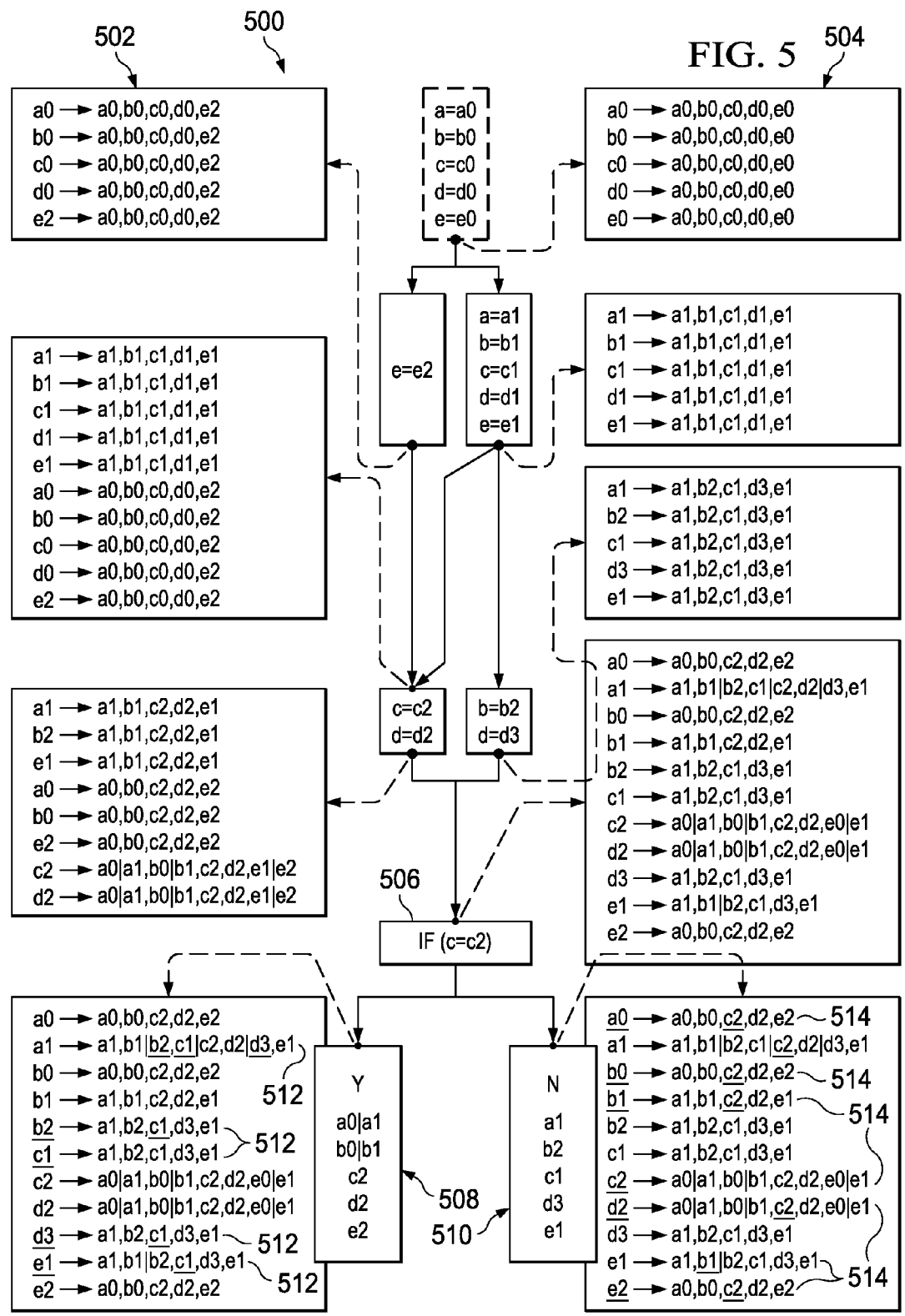
FIG. 5 is a block diagram of a control flow analysis using a deduction matrix similar to the deduction matrix of FIG. 4, in accordance with various embodiments of the disclosure.

With reference to FIG. 5, a block diagram of a control flow graph used in an analysis to create a deduction matrix similar to the deduction matrix of FIG. 4, in accordance with various embodiments of the disclosure is presented. Control flow analysis 500 is an example of an analysis of a control flow graph using compilation system 200 of FIG. 2 and to create a deduction matrix similar to deduction matrix 400 of FIG. 4. While a deduction matrix is used for each block, the values of deduction matrix 400 of FIG. 4 do not correspond to the values presented in the deduction matrices in FIG. 5.

Control flow analysis 500 contains a set of variables 502 represented in an initial state. The status of variables 502 is changed during a flow through block 504. Block 506 represents a change in variable e from e0 to e2 as a result of flowing through block 504. Block 508 reflects the status of definitions based on original values of the set of variables 502.

In a similar manner, data also flows in a path to block 510 in which a change in values for variables a, b, c, d and e occurs. Data continue to flow in both paths to block 512 and block 514. Block 512 introduces a change to variables c and d while block 514 introduces a change to variables b and d. Block 516 represents the union of block 504 and block 510 comprising changed values after data passes through block 512. For example, row 518, having variable c2, contains pairs of values separated by a vertical bar, such as a0|a1 to denote an alternative is present for the instance of c2. Block 520 contains values representing a result of data flow through the changes of block 514 and the union of block 504 and block 510.

Block 522 represents application of a condition in the form of determining whether c=c2. The condition acts as a control point. Block 524 represents the result of content represented in block 516 flowing through block 522. Variable instances represented in the alternative form of a0|a1 and b0|b1 indicate multiple instances that remain to be determined. For example a0|a1 indicates either a0 or a1 may be possible. Rows 528 of block 526 indicate instances including impossible definitions as determined from the data input of previous blocks and the condition specified in block 522. For example, row 530 contains instances of b2, c1 and d3. In this example, c1 was determined to be impossible based on the predicate of a predecessor block. Block 512 set c to c2 while block 522 specified a condition in which c=c2 thereby eliminating c1. However, b2 and d3 were deduced to be impossible because associated element c1 was determined to be impossible. When condition c=c2 is true, the data flow occurs through block 512 and not block 514. Deduction is an enhancement in the exemplary data flow analysis. Typical data flow analysis does not use deduction because of the conservative nature of the analysis. Deduction provides more precision in the data flow analysis by further refining possible reaching definitions to exclude those reaching definitions deduced to be impossible using information in predicates.

Block 524 and block 532 therefore contains elements that are possible reaching definitions that are a subset of all reaching definitions. Block 532 contains another subset of variables determined to have possible reaching definitions resulting from traversing a data path through block 510 and block 514. Rows 536 identify entries containing reaching definitions that are determined to be impossible or have been deduced to be impossible to attain.

Figure 6:
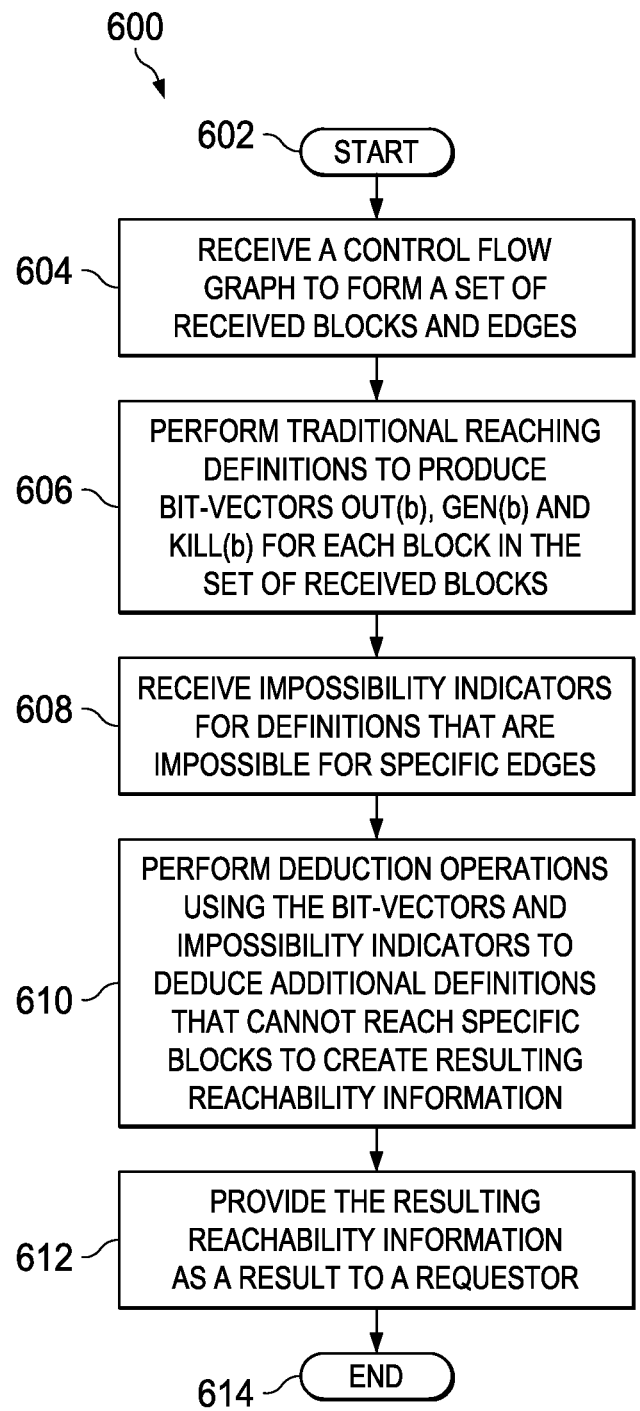
FIG. 6 is a flowchart of a high level view of a control flow analysis using a deduction matrix similar to the deduction matrix of FIG. 4, in accordance with various embodiments of the disclosure.

With reference to FIG. 6, a flowchart of a high level view of a control flow analysis using a deduction matrix similar to the deduction matrix of FIG. 4, in accordance with various embodiments of the disclosure is presented. Process 600 is an example of a process for deductive reaching definition analysis using compilation system 200 of FIG. 2 and a deduction matrix similar to the deduction matrix 400 of FIG. 4.

Process 600 begins (step 602) and receives a control flow graph to form a set of received blocks and edges (step 604). Process 600 performs traditional reaching definitions to produce bit-vectors OUT(b), GEN(b) and KILL(b) for each block in the set of received blocks (step 606). Process 600 receives impossibility indicators for definitions that are impossible for specific blocks (step 608). Computing traditional reaching definitions provides indications regarding reachability in the form of impossibility indicators for blocks related to the specific edges used in the computations. For example, a computation may produce a definition that cannot reach a block and therefore provide an impossibility indicator for that definition.

A deduction operation is performed by process 600 using a combination of the bit-vectors with the impossibility indicators to deduce additional reaching definitions that cannot reach specific blocks. The deduction operation produces bit-matrices composed of bits representing reachability implications between pairs of definitions. Further dataflow analysis modifies the bit-matrices using the bit-vectors and impossibility indicators and computes a main diagonal of each of the bit-matrices to form the resulting reachability information (step 610).

Process 600 provides the resulting reachability information as a result to a requestor (step 612) with process 600 terminating thereafter.

Figure 7:
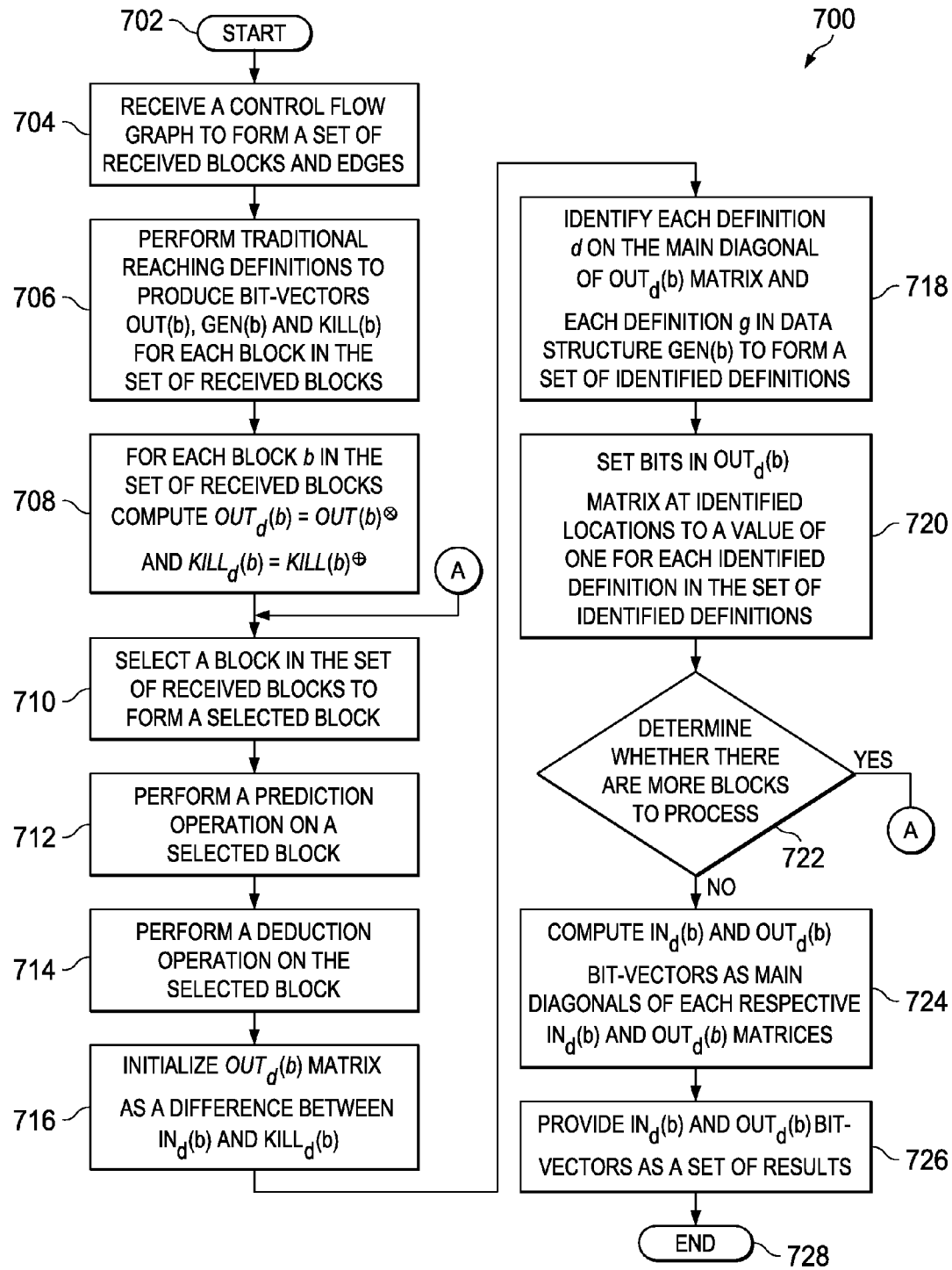
FIG. 7 is a flowchart of a control flow analysis using a deduction matrix similar to the deduction matrix of FIG. 4, in accordance with various embodiments of the disclosure.

With reference to FIG. 7, a flowchart of a control flow analysis using a deduction matrix similar to the deduction matrix of FIG. 4, in accordance with various embodiments of the disclosure is presented. Process 700 is an example of a control flow analysis process using compilation system 200 of FIG. 2 and a deduction matrix similar to the deduction matrix 400 of FIG. 4.

Process 700 starts (step 702) and receives a control flow graph to form a set of received blocks and edges (step 704). A control flow graph contains information describing the data flow though various blocks in the program of interest. Process 700 performs traditional reaching definitions computation to produce bit-vectors OUT(b), GEN(b) and KILL(b) for each block in the set of received blocks (step 706). Typical data analysis techniques suffice for these operations. Existing compiler analyses, such as constant propagation or constraint propagation, are used to conclude that some definitions cannot reach certain program points. The particular analyses employed can vary, so long as the analysis can produce for each edge a set of definitions that are impossible on that edge. Using this impossibility information can already provide a refined notion of "reachability," though it is not useful because the notion gives only information that the compiler could already have determined by existing analysis. Therefore, further processes augment this initial analysis.

For each block b in the set of received blocks, process 700 computes $OUT_d(b)=OUT(b)^{\otimes}$ and a $KILL_d(b)=KILL(b)^{\oplus}$ matrices (step 708). In one example, process 700 traverses the set of received blocks in reverse post order. Process 700 selects a block in the set of received blocks; in accordance with a data flow engine in use, to form a selected block (step 710). The selected block is taken in sequential order from the reverse posted set of received blocks. Process 700 performs a predication operation on the selected block in (step 712). A detail view of the predication operation is provided in FIG. 9.

The deductive IN set for a block b is defined as:

$$IN_d(b) = \bigcup_{p \in PREDS(b)} OUT_d(p) - IMP(p, b)^{\oplus}$$

The definition augments the usual composition operator for the forward union bit-vector analysis with a term IMP(p, b) representing predicate filtering that is the set of definitions the predicate has determined to be impossible for the control flow edge from block p to block b. In the degenerate case, without predicate filtering, IMP(p, b) would be empty and deductive reaching definitions would produce the same results as traditional reaching definitions.

The deductive $OUT_d$ set will be produced the usual way, but with an additional term $DED_d$ representing the results of the deduction step as shown in the following relationship: $OUT_d(b)=IN_d(b)-KILL_d(b)-DED_d(b)+GEN_d(b)$. The deductive $KILL_d$ is defined as $KILL_d(b)=KILL(b)^{\oplus}$. To compute the $GEN_d$, an auxiliary survivor set SURV, as in traditional reaching definitions is used as follows: $SURV(b)=(IN_d(b)-KILL_d(b))^{DIAG}$. This bit-vector contains the set of definitions that reached this block from its predecessors and were not killed, that is, the definitions 'survived' within the block (b). The deductive $GEN_d$ set is defined as: $GEN_d(b)= GEN(b)^{\otimes} GEN(b)+GEN(b)^{\otimes} SURV(b)+SURV(b)^{\otimes} GEN(b)$. This step ensures that $OUT_d(b)$ has bits (x,y) and (y,x) set for any pair x and y of definitions that could be simultaneously active at the end of the block.

Process 700 performs a deduction operation on the selected block (step 714). A detail view of the deduction operation is provided in FIG. 10.

Process 700 initializes a data structure $OUT_d(b)$ matrix as a difference calculated between $IN_d(b)$ matrix and $KILL_d(b)$ matrix (step 716). Identify each definition on the main diagonal of the data structure $OUT_d(b)$ matrix and each definition in the data structure generation set GEN(b) to form a set of identified definitions is performed (step 718). Process 700 sets the bits in the data structure $OUT_d(b)$ matrix at identified locations represented as (d,d), (d,g), (g,d) to a value of 1 for each identified definition in the set of identified definitions (step 720). The identified locations are specific locations for respective definitions as deduced in the $OUT_d(b)$ matrix and created in the generation set, GEN(b). The $OUT_d(b)$ matrix is thus updated by a union operation to include all bits from GEN(b)⊗ GEN(b)+GEN (b)⊗ SURV(b)+SURV(b)⊗ GEN(b).

The set of operations reduces or eliminates a number of blocks, in the control flow graph, that are determined to not reach a target block in a respective reaching definition. The set of operations may be repeated until convergence is attained. A typical convergence process may be used. The set of operations analyzes each bit-matrix by performing a modification of the bit-matrices until a determination is made that the analysis has completed.

Process 700 determines whether there are more blocks to process (step 722). When a determination is made that there are more blocks to process, a "yes" result is obtained. When a determination is made that there are no more blocks to process, a "no" result is obtained. When a "yes" result is obtained in step 722, process 700 loops back to step 710 to select a block as before. When a "no" result is obtained in step 722, process 700 computes $IN_d(b)$ bit-vector as a main diagonal of $IN_d(b)$ and $OUT_d(b)$ bit-vector as a main diagonal of $OUT_d(b)$ matrix (step 724). Process 700 provides the $IN_d(b)$ and $OUT_d(b)$ bit-vectors as a set of results (step 726) with process 700 terminating thereafter (step 728).

The results are available to a requester or consumer in the form of optimized reaching definitions. Optimized reaching definitions, in this example, refer to the clarification provided during the deduction operation. The deduction operation portion of the described process provides a capability to reduce the set of blocks needed for processing to the set of blocks that potentially reach a point in the program flow. Reducing the number of blocks, by eliminating those blocks that are computed, or deduced, as impossible to reach a point in the program flow typically reduces the processing time of the program.

Figure 8:
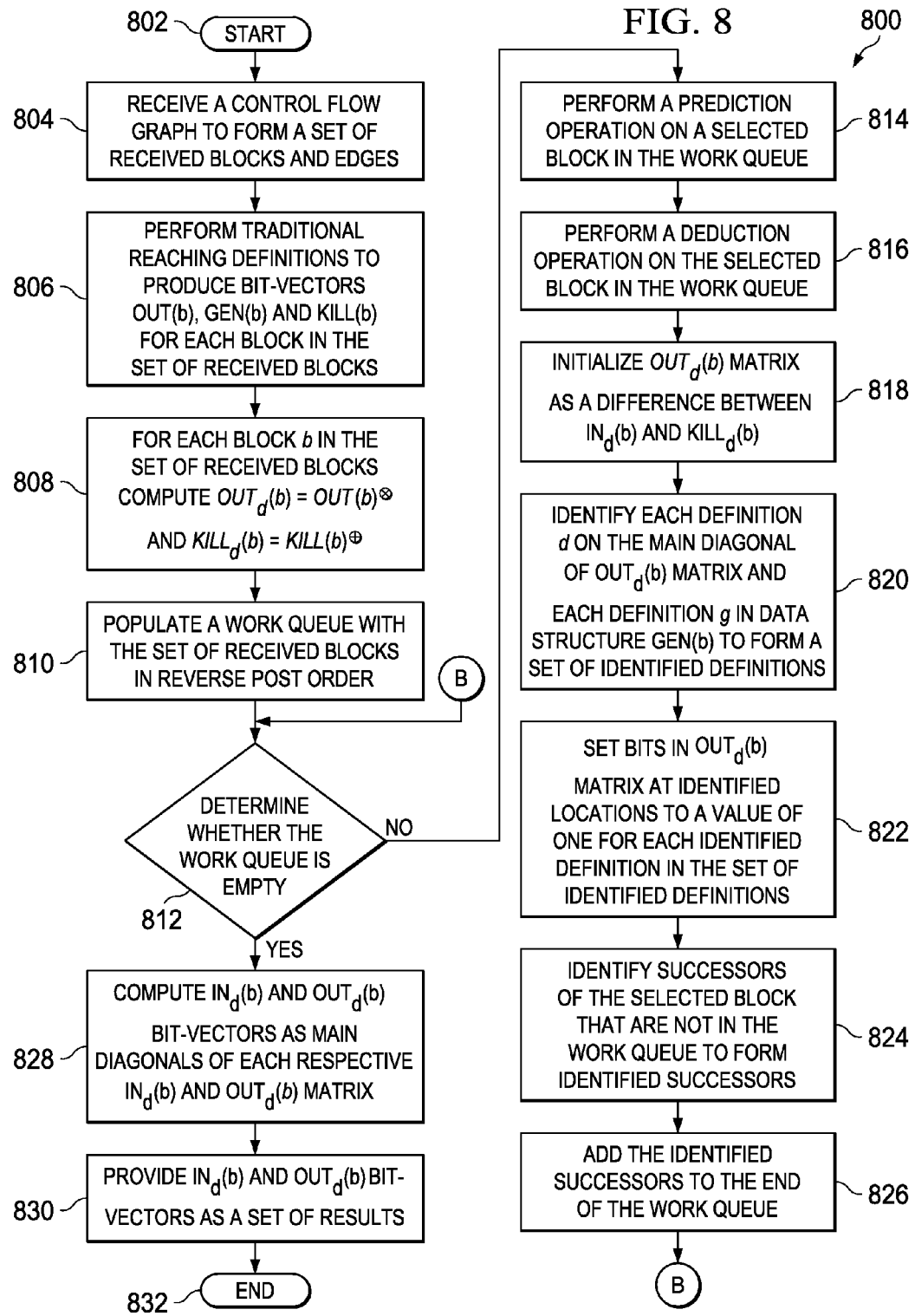
FIG. 8 is a flowchart of a control flow analysis using a deduction matrix similar to the deduction matrix of FIG. 4 with addition of a work queue, in accordance with various embodiments of the disclosure.

With reference to FIG. 8, a flowchart of a control flow analysis using a deduction matrix similar to the deduction matrix of FIG. 4 with a work queue, in accordance with various embodiments of the disclosure is presented. Process 800 is an example of a control flow analysis process using compilation system 200 of FIG. 2 and a deduction matrix similar to the deduction matrix 400 of FIG. 4. Process 800 is an alternate embodiment of process 700 of FIG. 7, with the addition of a work queue to manage the set of received blocks.

Process 800 starts (step 802) and receives a control flow graph to form a set of received blocks and edges (step 804). A control flow graph contains information describing the data flow though various blocks in the program of interest. Process 800 performs traditional reaching definitions computation to produce bit-vectors OUT(b), GEN(b) and KILL(b) for each block in the set of received blocks (step 806). Typical data analysis techniques suffice for these operations.

For each block b in the set of received blocks, process 800 computes $OUT_d(b)=OUT(b)$⊗ and a $KILL_d(b)=KILL(b)^⊕$ matrices (step 808). A work queue is populated with the set of received blocks in a reverse post order (step 810). The work queue provides an alternative capability to "visit", add and remove members or blocks during processing of the set of received blocks from that of process 700 of FIG. 7.

Process 800 determines whether the work queue is empty (step 812). When a determination is made that the work queue is empty, a "yes" result is obtained. When a determination is made that the work queue is not empty, a "no" result is obtained. When a "yes" is obtained in step 812, process 800 skips to step 830. When a "no" is obtained in step 812, process 800 performs a predication operation on a selected block in the work queue (step 814). A detail view of the predication operation is provided in FIG. 9. Process 800 performs a deduction operation on the selected block in the work queue (step 816). A detail view of the deduction operation is provided in FIG. 10.

Process 800 initializes a data structure $OUT_d(b)$ matrix as a difference calculated between $IN_d(b)$ matrix and $KILL_d(b)$ matrix (step 818). Identify each definition d on the main diagonal of the $OUT_d(b)$ matrix and each definition g in a data structure of the generation set, GEN(b), to form a set of identified definitions is performed (step 820). Process 800 sets the bits in the $OUT_d(b)$ matrix at identified locations represented as (d,d), (d,g), (g,d) to a value of 1 for each identified definition in the set of identified definitions (step 822). The identified locations are specific locations for respective definitions as deduced in the $OUT_d(b)$ matrix and created in the generation set, GEN(b).

The set of operations reduces or eliminates a number of blocks, in the control flow graph, that are determined to not reach a target block in a respective reaching definition. The set of operations may be repeated until convergence is attained. A typical convergence process may be used.

Process 800 identifies successors of the selected block that are not in the work queue (step 824). Process 800 adds the identified successors, of the selected block, to the end of the work queue (step 828). Process 800 loops back to step 812 to determine whether the work queue is empty.

Returning to step 812, when a "yes" result is obtained in step 812, process 800 skips to step 828 to compute $IN_d(b)$ and $OUT_d(b)$ bit-vectors as main diagonals of each respective $IN_d(b)$ and $OUT_d(b)$ matrix (step 828). Process 800 provides the $IN_d(b)$ and $OUT_d(b)$ bit-vectors as a set of results (step 830) with process 800 terminating thereafter (step 832).

The results are available to a requester or consumer in the form of optimized reaching definitions. Optimized reaching definitions, in this example, refer to the clarification provided during the deduction operation. The deduction operation portion of the described process provides a capability to reduce the set of blocks needed for processing to the set of blocks that potentially reach a point in the program flow. Reducing the number of blocks, by eliminating those blocks that are computed, or deduced, as impossible to reach a point in the program flow typically reduces the processing time of the program.

Figure 9:
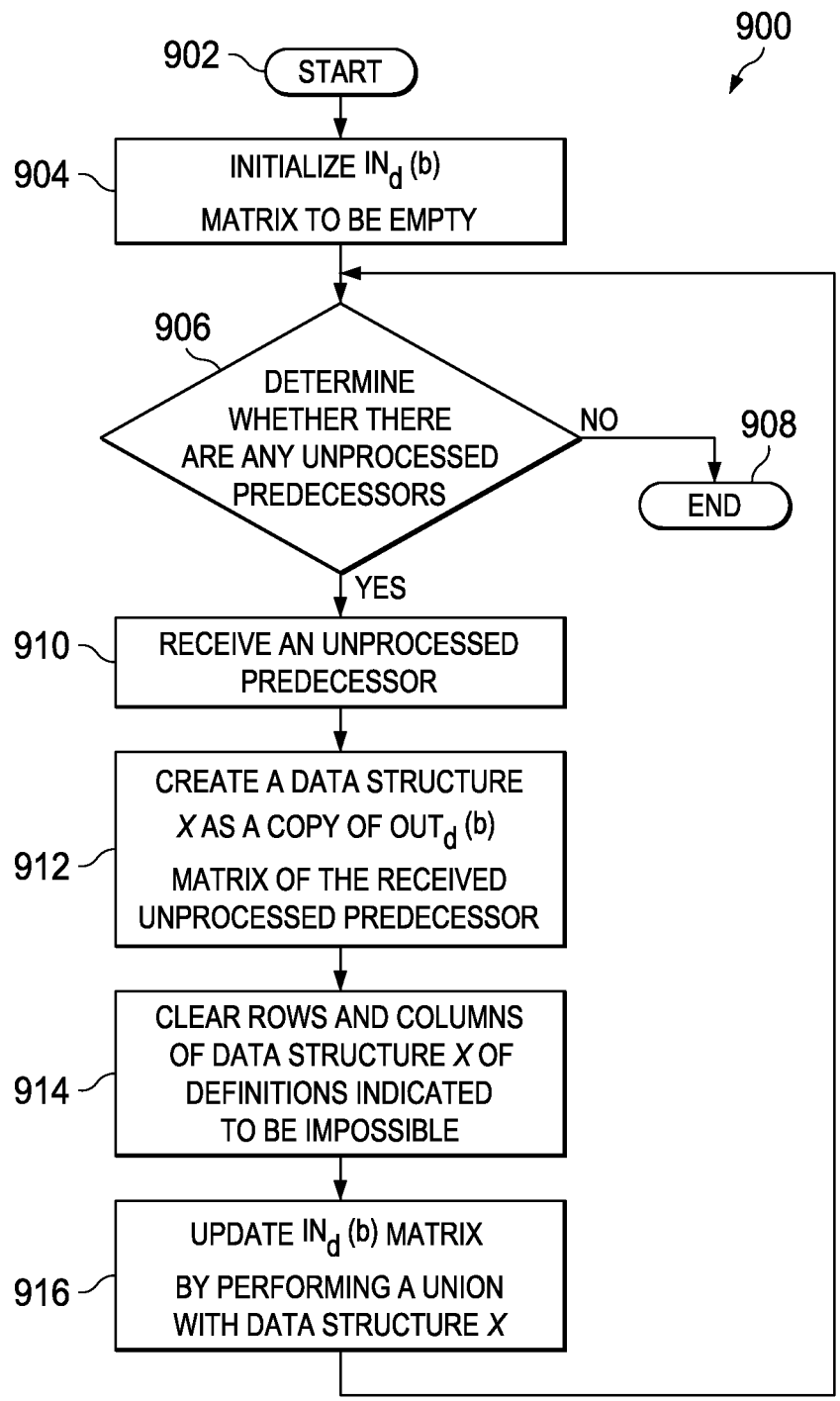
FIG. 9 is a flowchart of a predicate analysis portion of the control flow analysis of FIG. 7, in accordance with various embodiments of the disclosure.

With reference to FIG. 9, a flowchart of a predicate analysis portion of the control flow analysis process of FIG. 7, in accordance with various embodiments of the disclosure is presented. Process 900 is an example of a predicate analysis process within the control flow analysis process of FIG. 7 as well as a similar function in FIG. 8.

A general form of predicate filtering is a function that maps each control flow edge to a set of definitions; these are the definitions known to be inactive on that edge. There are several ways to prove some definitions inactive. A simple process considers only definitions that assign known constant values to variables. The predicate in this situation can be used to test and prove that a definition from a block is inactive on an edge. A more general and powerful approach based on global constraint propagation is used. In this approach constraint propagation logic is augmented to annotate each edge with value constraints on each value number and on each variable. Proving that a definition is inactive is a matter of intersecting the constraint for the value number of the definition with the value number of the target variable of the definition target. When the intersection is empty, that definition is inactive. Other forms of predicate filtering are possible, depending on the existing analysis infrastructure upon which deductive reaching definition is to be implemented.

Predicate analysis of process 900 starts (step 902) and initializes an empty data structure $IN_d(b)$ matrix (step 904). Process 900 determines whether there are any unprocessed predecessors (step 906). When a determination is made that there are unprocessed predecessors, a "yes" result is obtained. When a determination is made that there are no unprocessed predecessors, a "no" result is obtained.

When a "no" result is obtained in step 906, process 900 ends (step 908). When a "yes" result is obtained in step 906, process 900 receives an unprocessed predecessor (p) (step 910). Process 900 creates a data structure X as a copy of $OUT_d(p)$ matrix of the received unprocessed predecessor (step 912). Within the data structure X, process 900 clears rows and columns of data structure X of definitions indicated to be impossible to reach (step 914). An indication of impossibility may be provided from analysis performed in optimization services 218 of compiler 202 of FIG. 2. The definitions to be cleared are those definitions indicated as impossible reaching definitions. Clearing the rows and the columns of $OUT_d(p)$ matrix therefore occurs for each definition computed to be impossible during the predicate operation.

Information from other optimizer analysis, such as optimization services 218 already existing in compiler 202 of FIG. 2, that can provide help for the predicate analysis for pruning the set of possible definitions on a certain control flow graph edge is also used. For example, when a definition states "x=1" and later a branch states "if x>10", and the program follows that branch, then the definition for "x=1" is impossible. The branch would not be taken when "x=1" reflected the value actually in x. This information would trigger the pruning of the row and column associated with "x=1". Compiler 202 of FIG. 2 can provide predication information for each control flow graph edge. The per-edge predicate information is used to derive conclusions about whether a definition is or is not possible within a selected block. The per-edge information may then be considered as per-block information.

Update $IN_d(b)$ matrix by performing a union with data structure X is performed (step 916). Process 900 computes $IN_d(b)$ as a union of $OUT_d(p)$ matrices from all predecessor blocks p of blocks b with rows and columns cleared in accordance with received impossibility indicators for the edge from all predecessor blocks p of blocks b and computes $OUT_d(b)$ as $IN_d(b)-KILL(b)^{\oplus}$. Process 900 returns to step 906 to determine whether there are any unprocessed predecessors as before.

Figure 10:
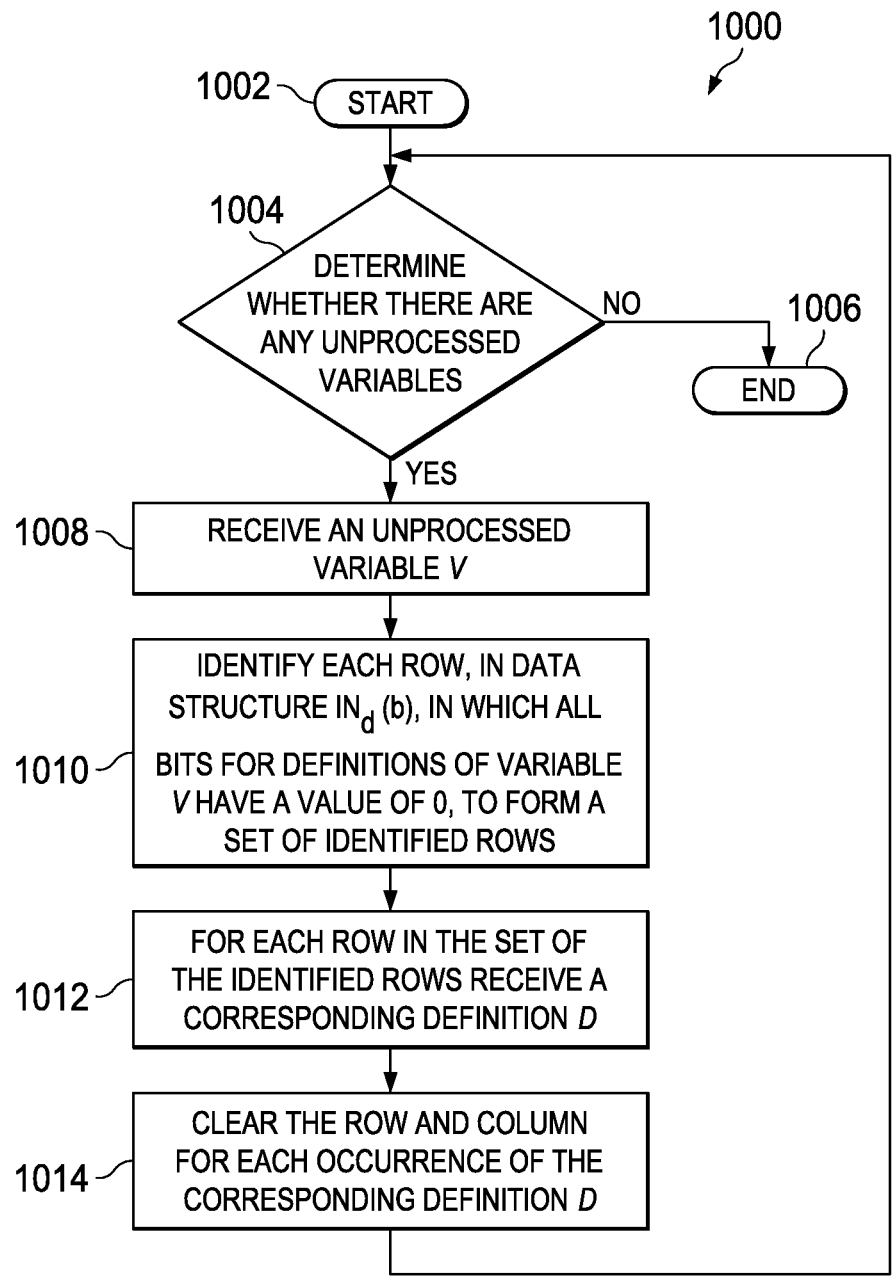
FIG. 10 is a flowchart of a deduction analysis portion of the control flow analysis of FIG. 7, in accordance with various embodiments of the disclosure.

With reference to FIG. 10, a flowchart of a deduction analysis portion of the control flow analysis process of FIG. 7, in accordance with various embodiments of the disclosure is presented. Process 1000 is an example of a deduction analysis portion of control flow analysis process 700 of FIG. 7 as well as the similar process of FIG. 8.

An entry block is treated as though it contains one "dummy" definition for each variable. Every variable must have at least one of the bits in the definition of the variable set in the bit-vector of the reaching definition at every program point. To track the relationships between pairs of definitions, the bit-vector of traditional reaching definitions is replaced with a square matrix, in which bits represent a relationship between some pair of definitions. A particular relationship used defines that the bit at location (r,c) represents the proposition 'r reaches' implies 'c reaches'. More precisely, each row in this matrix is associated with a particular definition in the program, and corresponds to the set of reaching definitions conditional on that definition being active.

The row $R_d$ for definition d of variable w represents the following proposition: $a_w=d \Rightarrow \forall v: a_v \in Rd \cap DEFS(v)$. The expression is the same as a traditional reaching definition with an implication pre-pended to the left, and it is this implication that will permit the desired deductions to be made. Because each row of this matrix is a bona fide reaching definition bit-vector, the property that every variable must have at least one of the bits in the definition of the variable set in the bit-vector of the reaching definition at every program point as previously stated still holds true. However, in deductive reaching definitions, the property does not just describe the allowed states of the bit-vector as it did in ordinary reaching definitions; rather, the property defines an active role in the deduction process. Predicate filtering clears bits in $R_d$, and it is entirely possible that the resulting bit-vector violates the property, making the right-hand side of equation false. From this, is deduced the left-hand side is also false, meaning d is inactive. Thus, by combining predicate filtering and implication tracking, definitions that could not have been ruled out by ordinary reaching definitions, nor by value numbering, or by any other existing technique may be eliminated. When this matrix is created as few bits as possible are set to minimize the resulting use-definition chains.

An overview of a deduction analysis is provided. Deduction analysis is performed for each symbol s, by finding all rows r such that row r in the data structure $IN_d(b)$ contains none of the bits set representing definitions of s. Since it is impossible for the symbol s to have no definitions because of the dummy definitions added to the start block, a deduction is made that the definition for r is impossible. Having determined the definition for r to be impossible, clear the r row and r column. In the following example, a variable is denoted as V and a definition is denoted as D.

Process 1000 starts (step 1002) and determines whether there are any unprocessed variables (step 1004). When a determination is made that there are unprocessed variables, a "yes" result is obtained. When a determination is made that there are no unprocessed variables, a "no" result is obtained. When a "no" result is obtained in step 1004, process 1000 ends (step 1006). When a "yes" result is obtained in step 1004, process 1000 receives an unprocessed variable V (step 1008). Process 1000 identifies each row in data structure $IN_d(b)$ matrix, in which all bits for definitions of variable V have a value of "0", to form a set of identified rows (step 1010). Process 1000 receives, for each row in the set of the identified rows, a corresponding definition D (step 1012). Clear the row and column for each occurrence of the corresponding definition D is performed (step 1014), with process 1000 looping back to step 1004 to determine whether there are any unprocessed variables as before. For example, the dataflow analysis of the deduction operation identifies two variables R and C such that a row of $OUT_d(b)$ corresponding to R contains no bits set for any definition of C; and clears a row and column of $OUT_d(b)$ corresponding to R.

Illustrative embodiments thus provide a computer-implemented process, a computer program product and an apparatus for deductive reaching definition analysis. One illustrative embodiment provides a computer-implemented process with a capability for deductive reaching definition analysis that receives a control flow graph to form a set of received blocks, performs traditional reaching definitions to produce bit-vectors OUT(b), GEN(b) and KILL(b) for each block in the set of received blocks and computes for each block in the set of received blocks $OUT_d(b) = OUT(b) \otimes$ and $KILL_d(b) = KILL(b)^{\oplus}$. The computer-implemented process further performs a set of operations including a deduction operation on each block in the set of received blocks, and determines whether there are more blocks to process. Responsive to a determination that there are no more blocks to process, computes an IN(b) bit-vector as a main diagonal of a corresponding $IN_d(b)$ matrix and an OUT(b) bit-vector as a main diagonal of a corresponding $OUT_d(b)$ matrix, and provides the IN(b) bit-vector and the OUT(b) bit-vector to a requester as a result.

Using appropriate dataflow equations as described, one embodiment as a computer-implemented process combines bit-vector information with additional information about branches in the control flow graph to produce a set of bit matrices in which each bit describes a reachability relationship between some pair of definitions. The dataflow analysis examines these relationships to deduce the impossibility of some definitions in some blocks. Responsive to a determination that the dataflow analysis has terminated, the process then computes a main diagonal of the resulting bit-matrix for each block and provides the computed main diagonal as a substitute for a result that would have been provided by traditional reaching definitions. The result is then processed, as would any traditional reaching definition.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented process for deductive reaching definition analysis, the computer-implemented process comprising:
   a computer receiving a control flow graph to form a set of received blocks and edges;
   the computer performing traditional reaching definitions to produce bit-vectors OUT(b), GEN(b) and KILL(b) for each block in the set of received blocks;
   the computer receiving impossibility indicators for a set of definitions that are impossible on specific edges;
   the computer performing deduction operations using a combination of the bit-vectors and impossibility indicators to deduce that additional definitions cannot reach certain blocks to create resulting reachability information;
   wherein combining the bit-vectors with the impossibility indicators further comprises:

producing bit-matrices composed of bits representing reachability implications between pairs of definitions;
performing a dataflow analysis operation that modifies the bit-matrices using the bit-vectors and impossibility indicators;
computing a main diagonal of each of the bit-matrices to form the resulting reachability information; and
the computer providing the resulting reachability information as a result to a requestor.

2. The computer-implemented process of claim 1, wherein the dataflow analysis operation further comprises:
initializing a bit-matrix for each block, wherein, for each block b, a matrix OUT.sub.d(b) is initialized to OUT(b)⊗ ; and
analyzing each bit-matrix by performing a modification of the bit-matrices until a determination is made that the analysis has completed.

3. The computer-implemented process of claim 2, wherein the dataflow analysis operation further comprises a deduction operation comprising:
identifying two variables R and C such that a row of $OUT_d(b)$ corresponding to R contains no bits set for any definition of C corresponding to a column of $OUT_d(b)$; and
clearing a row and column of $OUT_d(b)$ corresponding to R.

4. The computer-implemented process of claim 2, wherein the dataflow analysis operation further comprises a generator operation comprising:
computing $SURV_d(b)$ as the main diagonal of $IN_d(b)-KILL(b)^\oplus$; and
updating $OUT_d(b)$ by a union operation to include all bits from GEN(b)⊗ GEN(b), GEN(b)⊗ SURV(b), and SURV(b)⊗ GEN(b).

5. The computer-implemented process of claim 2, wherein the modification comprises:
computing $IN_d(b)$ as a union of $OUT_d(p)$ matrices from all predecessor blocks p of blocks b with rows and columns cleared in accordance with received impossibility indicators for an edge from all predecessor blocks p of blocks b; and
computing $OUT_d(b)$ as $IN_d(b)-KILL(b)^\oplus$, clearing additional bits of $OUT_d(b)$ by a deduction operation, and setting additional bits for any pair of definitions that could be simultaneously active at an end of the block.

6. The computer-implemented process of claim 5, wherein the deduction operation comprises:
identifying definitions whose corresponding columns in $IN_d(b)-KILL(b)^\oplus$ have no bits set in a row; and
clearing all bits in the row and a corresponding column.

7. A computer program product for deductive reaching definition analysis, the computer program product comprising:
a computer readable recordable-type storage media containing computer executable program code stored thereon, the computer executable program code comprising:
computer executable program code for receiving a control flow graph to form a set of received blocks and edges;
computer executable program code for performing traditional reaching definitions to produce bit-vectors OUT(b), GEN(b) and KILL(b) for each block in the set of received blocks;
computer executable program code for receiving impossibility indicators for a set of definitions that are impossible on specific edges;
computer executable program code for performing deduction operations using a combination of the bit-vectors and impossibility indicators to deduce that additional definitions cannot reach certain blocks to create resulting reachability information;
wherein computer executable program code for combining the bit-vectors with the impossibility indicators further comprises:
computer executable program code for producing bit-matrices composed of bits representing reachability implications between pairs of definitions;
computer executable program code for performing a dataflow analysis operation that modifies the bit-matrices using the bit-vectors and impossibility indicators;
computer executable program code for computing a main diagonal of each of the bit-matrices to form the resulting reachability information; and
computer executable program code for providing the resulting reachability information as a result to a requestor.

8. The computer program product of claim 7, wherein computer executable program code for performing the dataflow analysis operation further comprises:
computer executable program code for initializing a bit-matrix for each block, wherein, for each block b, a matrix OUT.sub.d(b) is initialized to OUT(b)⊗ , and computer executable program code for analyzing each bit-matrix by performing a modification of the bit-matrices until a determination is made that the analysis has completed.

9. The computer program product of claim 8, wherein computer executable program code for the dataflow analysis operation further comprises a deduction operation comprising:
computer executable program code for identifying two variables R and C such that a row of $OUT_d(b)$ corresponding to R contains no bits set for any definition of C corresponding to a column of $OUT_d(b)$; and
computer executable program code for clearing a row and column of $OUT_d(b)$ corresponding to R.

10. The computer program product of claim 8, wherein computer executable program code for the dataflow analysis operation further comprises computer executable program code for a generator operation comprising:
computer executable program code for computing $SURV_d(b)$ as the main diagonal of $IN_d(b)-KILL(b)^\oplus$; and
computer executable program code for updating $OUT_d(b)$ by a union operation to include all bits from GEN(b)⊗ GEN (b), GEN(b)⊗ SURV(b), and SURV(b)⊗ GEN(b).

11. The computer program product of claim 8, wherein computer executable program code for the modification comprises:
computer executable program code for computing $IN_d(b)$ as a union of $OUT_d(p)$ matrices from all predecessor blocks p of blocks b with rows and columns cleared in accordance with received impossibility indicators for the edge from all predecessor blocks p of blocks b; and
computer executable program code for computing $OUT_d(b)$ as $IN_d(b)-KILL(b)^\oplus$, clearing additional bits of $OUT_d(b)$ by a deduction operation, and setting additional bits for any pair of definitions that could be simultaneously active at the end of the block.

12. The computer program product of claim 11, wherein computer executable program code for the deduction operation comprises:
computer executable program code for identifying definitions whose corresponding columns in $IN_d(b)-KILL(b)^\oplus$ have no bits set in a row; and computer executable program code for clearing all bits in the row and a corresponding column.

13. An apparatus for deductive reaching definition analysis, the apparatus comprising:
a communications fabric;
a memory connected to the communications fabric, wherein the memory contains computer executable program code;
a communications unit connected to the communications fabric; an input/output unit connected to the communications fabric; a display connected to the communications fabric; and
a processor unit connected to the communications fabric, wherein the processor unit executes the computer executable program code to direct the apparatus to:
receive a control flow graph to form a set of received blocks and edges;
perform traditional reaching definitions to produce bit-vectors OUT(b), GEN(b) and KILL(b) for each block in the set of received blocks;
receive impossibility indicators for a set of definitions that are impossible on specific edges;
perform deduction operations using a combination of the bit-vectors and impossibility indicators to deduce that additional definitions cannot reach certain blocks to create resulting reachability information;
wherein the processor unit further executes the computer executable program code to combine the bit-vectors with the impossibility indicators to direct the apparatus to:
produce bit-matrices composed of bits representing reachability implications between pairs of definitions;
perform a dataflow analysis operation that modifies the bit-matrices using the bit-vectors and impossibility indicators;
compute a main diagonal of each of the bit-matrices to form the resulting reachability information; and
provide the resulting reachability information as a result to a requestor.

14. The apparatus of claim 13, wherein the processor unit further executes the computer executable program code to perform the dataflow analysis operation to direct the apparatus to:
initialize a bit-matrix for each block, wherein, for each block b, a matrix OUT.sub.d(b) is initialized to OUT(b) $\otimes$ ; and
analyze each bit-matrix by performing a modification of the bit-matrices until a determination is made that the analysis has completed.

15. The apparatus of claim 14, wherein the processor unit further executes the computer executable program code to perform the dataflow analysis operation further comprising a deduction operation to direct the apparatus to:
identify two variables R and C such that a row of $OUT_d(b)$ corresponding to R contains no bits set for any definition of C corresponding to a column of $OUT_d(b)$; and
clear a row and column of $OUT_d(b)$ corresponding to R.

16. The apparatus of claim 14, wherein the processor unit further executes the computer executable program code to perform the dataflow analysis operation further comprising a generator operation to direct the apparatus to:
compute $SURV_d(b)$ as the main diagonal of $IN_d(b)$–$KILL(b)^{\oplus}$; and
update $OUT_d(b)$ by a union operation to include all bits from GEN(b)$\otimes$ GEN(b), GEN(b)$\otimes$ SURV(b), and SURV(b)$\otimes$ GEN(b).

17. The apparatus of claim 13, wherein the processor unit further executes the computer executable program code to perform the data flow analysis operation comprising a modification to direct the apparatus to:
compute $IN_d(b)$ as a union of $OUT_d(p)$ matrices from all predecessor blocks p of blocks b with rows and columns cleared in accordance with received impossibility indicators for an edge from all predecessor blocks p of blocks b; and
compute $OUT_d(b)$ as $IN_d(b)$–$KILL(b)^{\oplus}$, clearing additional bits of $OUT_d(b)$ by a deduction operation, and setting additional bits for any pair of definitions that could be simultaneously active at an end of the block.

* * * * *